US006957436B1

(12) United States Patent
Mihic

(10) Patent No.: US 6,957,436 B1
(45) Date of Patent: Oct. 18, 2005

(54) METHOD AND SYSTEM FOR MULTI-THREADED OBJECT LOADING AND UNLOADING

(75) Inventor: Matthew A Mihic, Cambridge, MA (US)

(73) Assignee: Iona Technologies, PLC, Dublin (IE)

( * ) Notice: Subject to any disclaimer, the term of this patent is extended or adjusted under 35 U.S.C. 154(b) by 0 days.

(21) Appl. No.: 09/890,444

(22) PCT Filed: Jan. 28, 2000

(86) PCT No.: PCT/US00/02015

§ 371 (c)(1),
(2), (4) Date: Dec. 14, 2001

(87) PCT Pub. No.: WO00/45239

PCT Pub. Date: Aug. 3, 2000

Related U.S. Application Data

(60) Provisional application No. 60/117,945, filed on Jan. 29, 1999, and provisional application No. 60/126,554, filed on Mar. 26, 1999.

(51) Int. Cl.[7] .................................................. G06F 9/46
(52) U.S. Cl. ....................................... 718/107; 718/102
(58) Field of Search ................................ 718/100, 102, 718/106, 107; 719/310, 315

(56) References Cited

U.S. PATENT DOCUMENTS 5,630,136 A 5/1997 Davidson et al. ........... 395/676
5,761,670 A * 6/1998 Joy ........................ 707/103 R
5,862,376 A * 1/1999 Steele et al. ................ 718/107
5,953,530 A * 9/1999 Rishi et al. ................. 717/127
6,161,147 A * 12/2000 Snyder et al. ............. 719/310
6,275,893 B1 * 8/2001 Bonola ....................... 710/262
6,351,778 B1 * 2/2002 Orton et al. ................ 719/310
6,453,319 B1 * 9/2002 Mattis et al. ............... 707/100
6,473,805 B2 * 10/2002 Lewis ........................ 709/246
6,640,255 B1 * 10/2003 Snyder et al. ............. 719/315

OTHER PUBLICATIONS

Glasser, 1995 #2 (Feb.), "Efficient Synchronization Techniques for Multithreaded Win32–based Applications," *Microsoft System Journal*, pp. 2–3.
International Search Report.

* cited by examiner

*Primary Examiner*—Majid Banankhah
(74) *Attorney, Agent, or Firm*—Lacasse & Associates, LLC; Randy W. Lacasse

(57) ABSTRACT

A method for controlling a table containing a list of active objects. The table is accessed by one or more threads in a multi-threaded computing environment. The method comprising the steps of mutex locking the table with a first thread when activating an object provided that the table is not locked by a second thread, and creating an entry for the object in the table when the entry does not exist in the table, wherein the entry includes a reference count. The method further comprises the steps of incrementing the reference count of the object if the table is locked by the second thread, and unlocking the table from the mutex lock after incrementing the reference count whether or not the object is completely activated. A system configured to perform steps similar to the above described steps is also provided.

16 Claims, 7 Drawing Sheets

METHOD AND SYSTEM FOR MULTI-THREADED OBJECT LOADING AND UNLOADING

This application is a 371 of PCT/US00/02015 filed Jan. 28, 2000, which claims benefit of Provisional application Ser. No. 60/117,945 filed Jan. 29, 1999 and claims benefit of Provisional application Ser. No. 60/126,554, filed Mar. 26, 1999.

FIELD OF THE INVENTION

The present invention relates to distributed object systems and more specifically loading and unloading of objects using multi-thread.

BACKGROUND OF THE INVENTION

With the rise of the interconnected computer networks such as the Internet, it is possible to construct complex transaction-based applications that are distributed over several networked computers. ID the simplest scenario, in general, these transaction-based applications function in the following way. A software application program, which executes on a client, initiates a transaction that requires access to services provided by a distant computer, called a server. Examples of these services could be an update to a database such as a bank's database, an execution of a purchase order such as in the case of purchase of a security and the like. Typically, the client sends a "request" message to the server, which then sends a "response" message containing a response to the request.

Typically, the server is not a single computer, rather a collection of interconnected heterogenous computers. The request message must then be formatted in such a way that all the interconnected computers can understand and respond to the request message. If the collection of interconnected computers is configured in an object-oriented programming model, then software object (or objects) that are capable of working together to provide a response to the request message can be distributed among the several computers. But in order to access the objects from a remote computer the objects must somehow publish their existence, their addresses, their properties, the services they provide, and other details to the "outside" world. Then, a client may be able to use the services provided by sending a request message in a manner similar to making a remote procedure call ("rpc") and obtaining a response to that message.

Various paradigms exist as a result of the need to standardize the methods by which objects can be distributed and accessed over a network. These are Microsoft Corporation's Distributed Component Object Model (DCOM), JavaSoft's Java/Remote Method Invocation (Java/RMI), and Object Management Group's Common Object Request Broker Architecture (CORBA).

Though some differences are present among these models, they principally work in the following way. Objects that provide services are typically located on servers. These objects are queried by applications running on clients using a specified data communication transport layer protocol—the Object Remote Procedure Call (ORPC) for DCOM; the Java Remote Method Protocol (JRMP) for Java/RMI; and the Internet Inter-ORB Protocol (IIOP) for CORBA. A client suitably formats a query message in the appropriate protocol language and transmits the query message, which is routed to the appropriate server, whereupon it is executed, and a response message is formatted and routed back to the client. As referred to herein, the term "object" may mean the object definition, associated operations, attributes, etc., and implementation for that object. As will be appreciated by those of skill in the art, at times the term "object type" is used to refer to the definition of the operations and attributes that software external to the object may use to examine and operate upon the object. The "object type" is also known as the "interface." Also, the term "object" may be used to refer to an actual run-time instance of an object and will be made clear by the context.

A server configured to be a Java/RMI server comprises objects that have predefined interfaces, which can be used to access the server objects remotely from another machine's Java Virtual Machine (JVM). A Java/RMI server object interfaces declare a set of methods that indicate the services offered by that server object. A program resident on the server called an RMI Registry stores and makes available to clients information about server objects. Typically, a client object obtains information regarding the methods and other properties of a server object by performing an operation such as "lookup" for a server object reference. This lookup typically works by the client object specifying an address in the form of a Universal Resource Locator (URL) and transmitting the address to the server's RMI Registry.

The clients and servers also include interceptors. The interceptors provide hooks to programmers to execute their piece of code at certain points during ORB. Typical uses of the interceptors include: transaction service integration, security message compression and encryption, fault tolerance and other operations such as tracing, profiling, debugging, logging.

In CORBA, each CORBA object transparently interacts with an Object Request Broker (ORB), which provides a means to access either local or remote objects. The ORB is essentially a remote method invocation facility, and forms the lowest layer of the several layers in CORBA. Each CORBA server object exposes a set of methods, and it declares its interface. A CORBA client obtains an object reference and determines which methods are provided by the object. A CORBA client needs only two pieces of information: a remote object's name, and how to use its interface. The ORB is responsible to locate the object, provide a vehicle by means of which a query is transmitted to a server object and a response is transmitted back to the client object. In general, a CORBA object interacts with an ORB by either using an ORB's interface or using an Object Adapter.

There are two kinds of object adapters, the Basic Object Adapter (BOA) and the Portable Object Adapter (POA). The BOA (or the POA) typically has methods for activating and deactivating objects, and for activating and deactivating the entire server. These are intended for systems where the ORB and the server are separate programs or even on separate machines. Different vendors supplying CORBA—compliant servers ordinarily choose one or the other of these methods of an object—ORB interaction.

As described above, CORBA objects take form within server applications. In a server, CORBA objects are implemented and represented by programming language functions and data. The programming language entities that implement and represent CORBA objects are called servants. A servant is an entity that provides a body for a CORBA object, and for this reason, the servant is said to incarnate the CORBA object.

Object adapters such as the CORBA-standard Portable Object Adapter (POA) mediate between an ORB and a set of programming language servants. In general, though there could be many instances of POAs to support CORBA objects of different styles, and all server applications have at least one POA called the Root POA. Each POA instance represents a grouping of objects that have similar characteristics. These characteristics are controlled via POA policies that are specified when a POA is created. The Root POA, which is present in all server applications, has a standard set of policies. POA policies are a set of objects that are used to define the characteristics of a POA and the objects created within it. The CORBA standard specifies that interfaces for POA, POA manager (which is a class to manage multiple POAs) and the POA policies should be defined in a standard module. Further, the POA policies can also define how threads are to be operated.

A thread-of-execution (a thread) is a sequence of control within a programmed-process. While, a traditional single-threaded process follows a single sequence-of-control while executing, a multi-threaded process has several sequences of control, and is capable of several independent actions.

Conventional multi-threaded software packages provide functions to create a thread and to begin execution. Typically, the software packages also provide a number of synchronization methods, such as MUTtual EXclusion (mutexes), condition variables and semaphores, etc.

A synchronization operation is implicated when two or more threads have to share a resource. Without proper synchronization, the threads may conflict with each other. For instance, one thread can operate on a value while another thread can attempt to change that value. Traditional solutions to this problem have resorted to the use of mutual exclusion primitives.

Before claiming a resource a thread must typically first obtain a lock on the resource. By definition, when obtaining the lock the thread knows that no other thread owns the lock for the resource, and that the thread is thus free to use the resource. If a second thread desires to claim the resource, it must wait to obtain the lock until the first thread is finished using the resource. When the first thread finishes using the resource, it releases the lock for the resource, thereby allowing other threads to access the resource.

In an ORB environment, an Active Object Table (AOT) registers objects that are active. Conventionally, in order to achieve the synchronization, the AOT is mutexed for duration of load. This prevents spawned threads from accessing the AOT. In other words, thread cannot relock without recursive mutex, so it can't load a number of objects. In order to solve this shortcomming, recursive mutexes are utilized in some conventional systems. However, the recursive mutex still has table level granularity. Another approach is to use multiple mutexes by providing one for a table and one for each object. This may achieve object level granularity, but it causes a large number of mutexes possibly wasting resources.

Further detailed background information can be found in Client/Server Programming with Java and CORBA, 2$^{nd}$ ed., Robert Orfali and Dan Harkey, John Wiley & Sons, Inc., 1998, relevant portions of which are incorporated herein by reference.

SUMMARY OF THE INVENTION

Therefore, the present invention provides a thread that can load or unload objects outside of a mutex lock and can access the Active Object Table (AOT) during loading and unloading. The present invention further provides loading or unloading thread that can spawn other threads, which in turn can access the AOT.

The present invention further provides object level granularity for serialization. For instance, four (4) threads trying to load object A would be serialized but any thread would be able to access object B while A was being loaded.

In particular, the present invention provides a method of controlling a life cycle of an object in a multi-thread computing environment. The method includes the steps of creating a table containing a list of active objects and determining whether or not an object is listed in the table. If the object is not listed in the table, then the method proyides the steps of mutex locking the table, entering an object id of the object into the table, setting a first count associated with the object id in the table to value of one, and unlocking the mutex lock without waiting until the object is completely loaded. If the object is listed in the table, then the method can provide the steps of incrementing the first count, and determining whether or not the object is etherealizing.

If the object is etherealizing, the method can also provide the steps of waiting the object to be completely etherealized, and reactivating the object. The method can further comprise the steps of incrementing the first count when an additional request is made to the object, and decrementing the first count when the request is dispatched on the object. Moreover, the method may also include the step of deactivating the object only when the first count is equal to zero.

The present invention also provides a method for controlling a table containing a list of active objects. The table is accessed by one or more threads in a multi-threaded computing environment. The method includes the steps of mutex locking the table with a first thread when activating an object provided that the table is not locked by a second thread, and creating an entry for the object in the table when the entry does not exist in the table, wherein the entry includes a reference count. The method also comprises the steps of incrementing the reference count of the object if the table is locked by the second thread, and unlocking the table from the mutex lock after incrementing the reference count whether or not the object is completely activated.

The method may also provide the steps of etherealizing the object only when the reference count of the object is zero, and incrementing a reactivation count if the object is etherealizing when the first thread attempts to activate the object, wherein the entry of the table further includes the reactivation count. Further, the method can also comprise the steps of broadcasting the reactivation count to wake any waiting object to reactivate the etherealized object, and decrementing the reference count after dispatching a request on the object. It should be noted that the method can also include the step of deactivating the object only when the reference count is equal to zero.

The present invention also provides a server computer in a client-server computing environment. The sever includes a memory configured to store a table containing a list of active objects and a processor configured to determine whether or not the object is listed in the table. The processor, if the object is not listed in the table, is further configured to mutex lock the table, to enter an object id of the object to be activated into the table, to set a first count to one, and to unlock the mutex lock without waiting until the object is completely loaded. The first count is associated with the object id in the table.

The processor can be further configured to increment the first count and to determine whether or not the object is etherealizing if the object is listed in the table. Furthermore, the processor can also be configured to wait the object to be completely etherealized, and to reactivate the object if the object is etherealizing.

The processor can also be configure to increment the first count when an additional request is made to the object and to decrement the first count when the request is dispatched on the object. The processor can be configured to deactivate the object only when the first count is equal to zero.

BRIEF DESCRIPTION OF THE DRAWINGS

Preferred features of the present invention are disclosed in the accompanying drawings, wherein similar reference characters denote similar elements throughout the several views, and wherein.

DETAILED DESCRIPTION OF THE INVENTION

Figure 1:
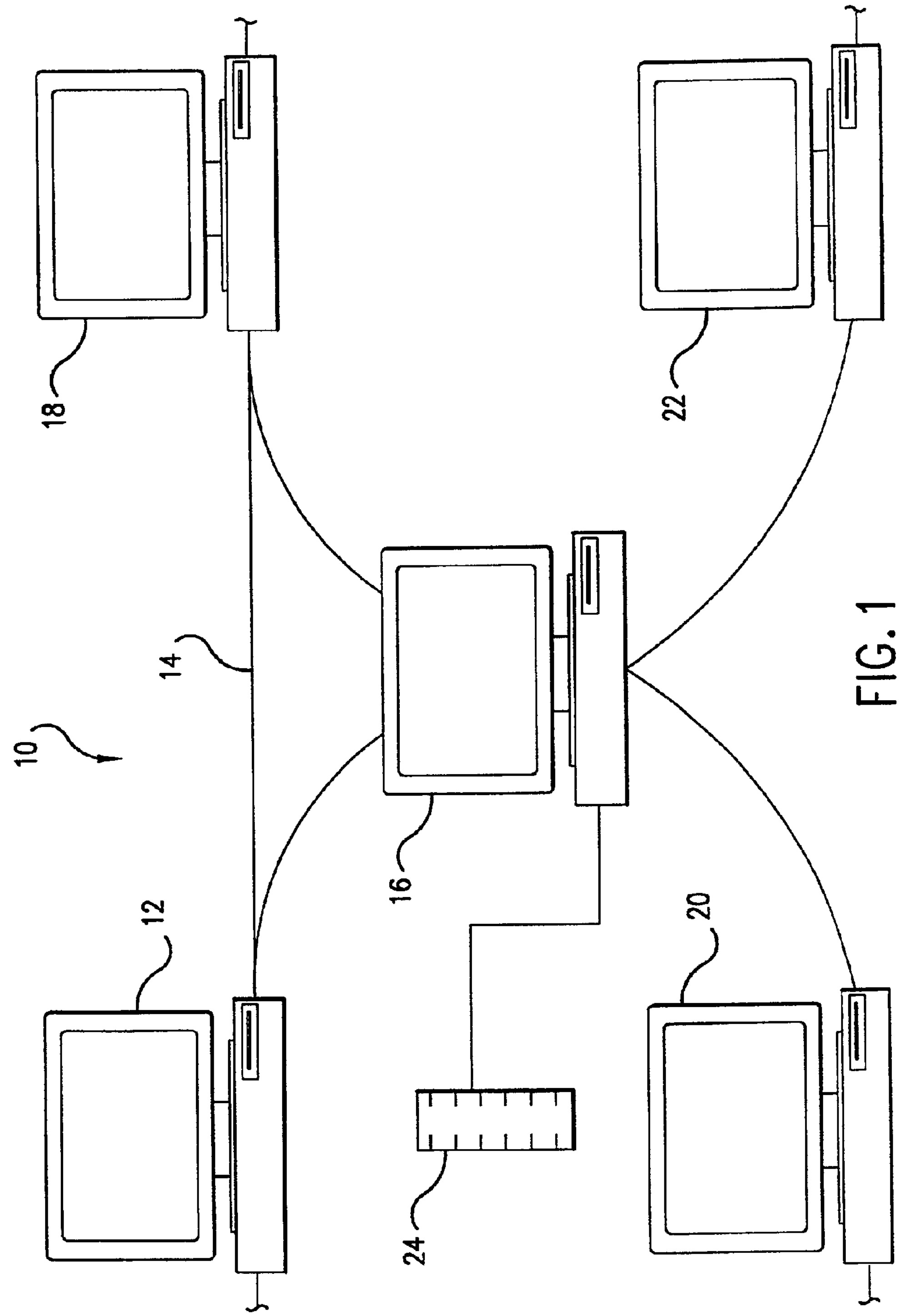
FIG. 1 is a diagram illustrating a computer network for the distribute objects of the present invention.

Referring to FIG. 1, distributed objects of the present invention are located on one or more computers linked together by a computer network exemplified in a network 10. In particular, the network 10 includes a computer 12 coupled to a network 14. The network 14 can further include a server, router or the like 16 in addition to other computers 18, 20, and 22 such that data, instructions and/or messages can be passed among the networked computers. A mass storage devices 24 may also be connected to the server 16 or to any of the computers. Further, some computers 12, 18 may include an independent network connection between them, whereas other computers 20, 22 may not include such a connection. Various ways to design, construct and implement the computer network as known in the art are contemplated within this invention.

Figure 2:
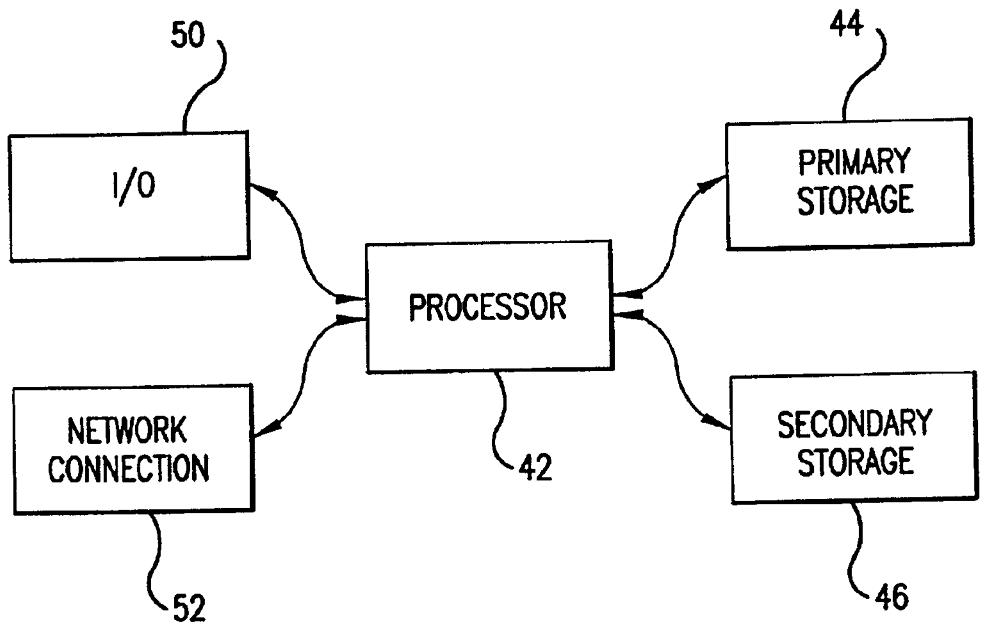
FIG. 2 is a block diagram of a typical computer of the present invention.

Referring to FIG. 2, each computers 12, 16, 18, 20, and 22 includes a processing unit 42, a primary storage device 44 and a secondary storage device 46. The processing unit 42 can be, but not limited to, a central processing unit (CPU), or multiple processors including parallel processors or distributed processors. The primary memory device 44 includes random access memory (RAM) and read only memory (ROM). The RAM stores programming instructions and data, including distributed objects and their associated data and instructions, for processes currently operating on the processor 42. The ROM stores basic operating instructions, data and objects used by the computer to perform its functions. The secondary storage device 46, such as a hard disk, CD ROM, magneto-optical (optical) drive, tape drive or the like, is coupled bidirectionaly with processor 42. The secondary storage device 46 generally includes additional programming instructions, data and objects that typically are not in active use by the processor, although the address space may be accessed by the processor, e.g., for virtual memory or the like.

Furthermore, each of the above described computers can include an input/output source 50 that typically includes input media such as a keyboard, pointer devices (e.g., a mouse or stylus) and the like. Each computer can also include a network connection 52. Other variations of the above discussed the computer and its components available to one of skill in the art are also contemplated within the present invention.

In the present invention computer network is defined to include a set of communications channels interconnecting a set of computer systems that can communicate with each other. The communications channels can include transmission media such as, but not limited to, twisted pair wires, coaxial cable, optical fibers, satellite links, and/or digital microwave radio. The computer systems can be distributed over large, or "wide" areas (e.g., over tens, hundreds, or thousands of miles. WAN), or local area networks (e.g. over several feet to hundreds of feet, LAN). Furthermore, various local- and wide-area networks can be combined to form aggregate networks of computer systems. One example of such a network of computers is the "Internet".

As discussed above, a requirement for a multi-thread (MT) component is the ability to synchronize access to internal data structures. While a simple requirement, designing for synchronization is complex, and requires great care to avoid deadlock and simplify development and maintenance while enabling concurrency and performance. Of particular concern is the granularity at which mutual-exclusive (mutexes) locks are applied. An excessive number of mutexes increases resource usage and significantly complicates code, while too few of mutexes reduces concurrency and performance.

Portable Object Adaptor (POA) uses a single mutex to protect access to all data within the POA hierarchy for a particular ORB. Effectively, each RootPOA owns a mutex which is shared by all of its children. This approach was chosen for several reasons.

First, several data structures (such as the Active Object Map and Child POA Map) may be shared across multiple POAs to reduce the cost of an individual POA—critical for supporting servers that require a large number of POAs (a likely situation, given that server-side QoS is specified at the POA level). Access to these shared data structures will need to be protected by mutex which is similarly shared across POAs.

Second, it is frequently necessary to access data for multiple POAs within a single critical section. An example of this can be seen in POA creation and destruction. POA creation requires read access to the parent POA state and parent POA list, and changes the state of child POAs. POA destruction is similar—destruction of a POA modifies its own state, its children's state, and its parent's child POA list within the same critical section. This makes it very complex to protect each POA its own mutex—access to each POA must be very carefully coordinated to prevent deadlock. The additional complexity raises maintenance cost, increases the likelihood of hard-to-diagnose errors, and makes the code base more fragile.

Third, it is frequently necessary to access several types of POA data within the same critical section—for example, it is frequently necessary to examine both the POA state and the POA Active Object Map in the same critical section. Similar to the second reason discussed above, this makes it very difficult to use separate mutexes for different types of data, and requires careful coordination of data structure access. The problem is compounded by the need to access shared data (i.e. POA state) and POA-local data (i.e. the default servant) within the same critical section.

Finally, this approach has the lowest overhead. Initially, using a single mutex appears to reduce performance by limiting concurrency. However, on uniprocessor systems, this approach actually improves performance by reducing extraneous context switches since all critical sections are compute bound, additional mutexes will only increase processor contention, not concurrency. On multiprocessor systems, additional mutexes does improve concurrency, but requires multiple mutex locks—an extremely expensive operation. Finally, the amount of code within a critical section is relatively small, unlikely to even be called from multiple threads (since most is related to POA initialization), and unlikely to dominate the time required to process a request.

In the present invention, calls to methods are preferably not made from system code to application code with an internal mutex locked—doing so introduces mutex layering, and opens the possibility for deadlock. To avoid any potential deadlock, the POA unlocks its internal mutex prior to calling any of the following methods:

AdapterActivator::unknown_adapter

ServantLocator::preinvoke/postinvoke

ServantActivator:: incarnate/etherealize

ServantBase::_add_ref/_remove_ref

ServantBase::_dispatch

Figure 3:
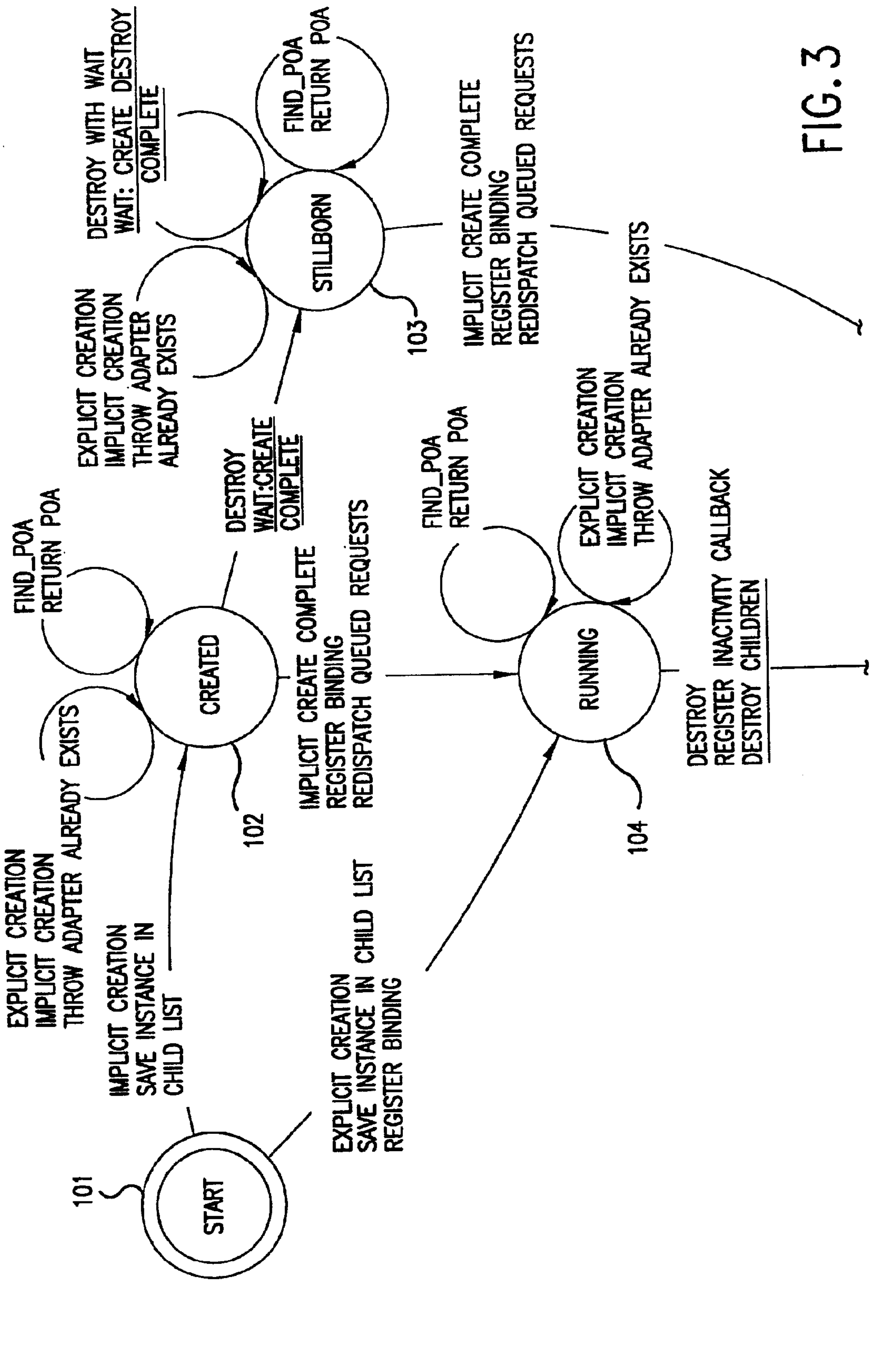
FIG. 3 is a state machine diagram illustrating the life cycle of the Portable Object Adaptor the present invention.
Figure 3A:
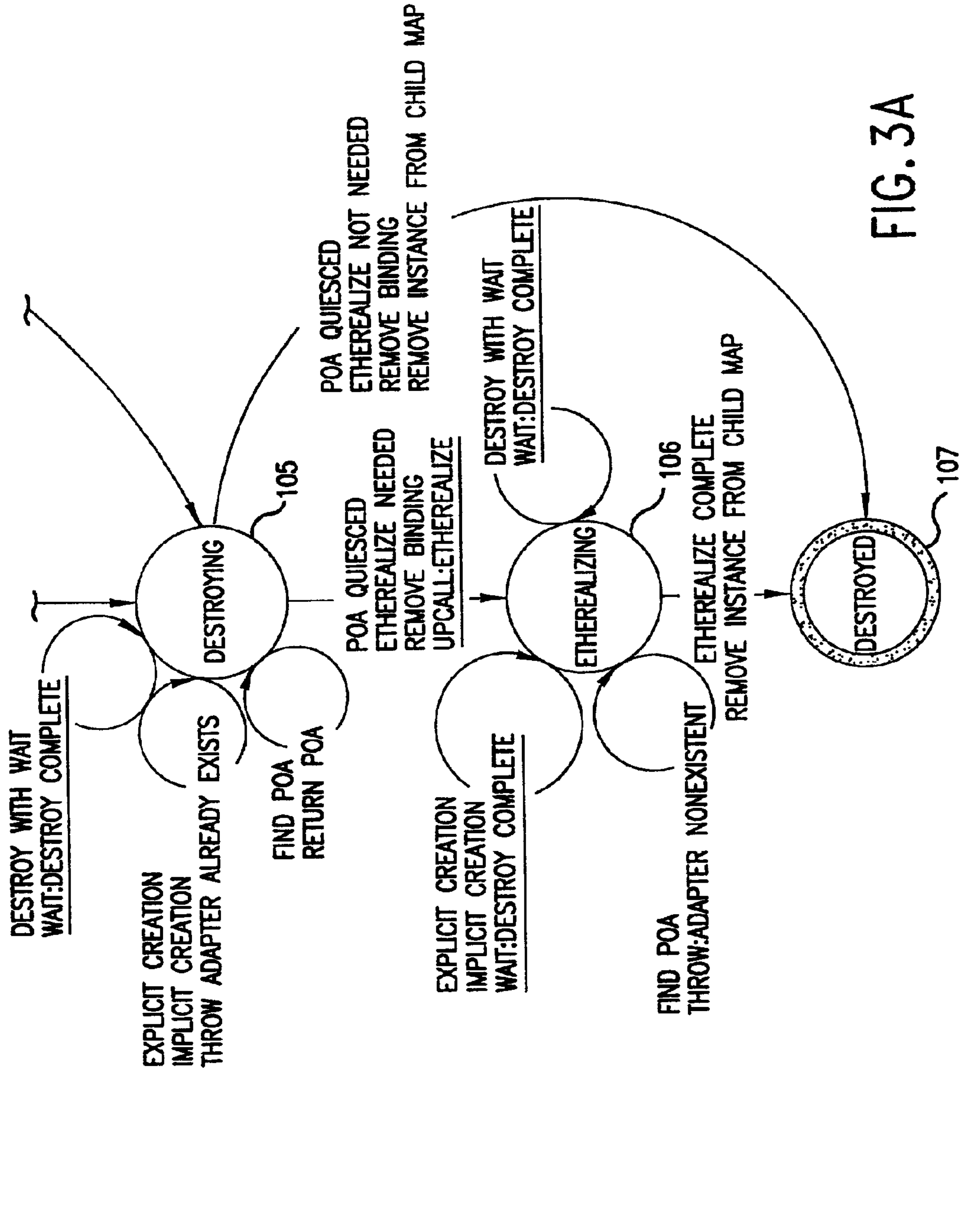
Figure 5:
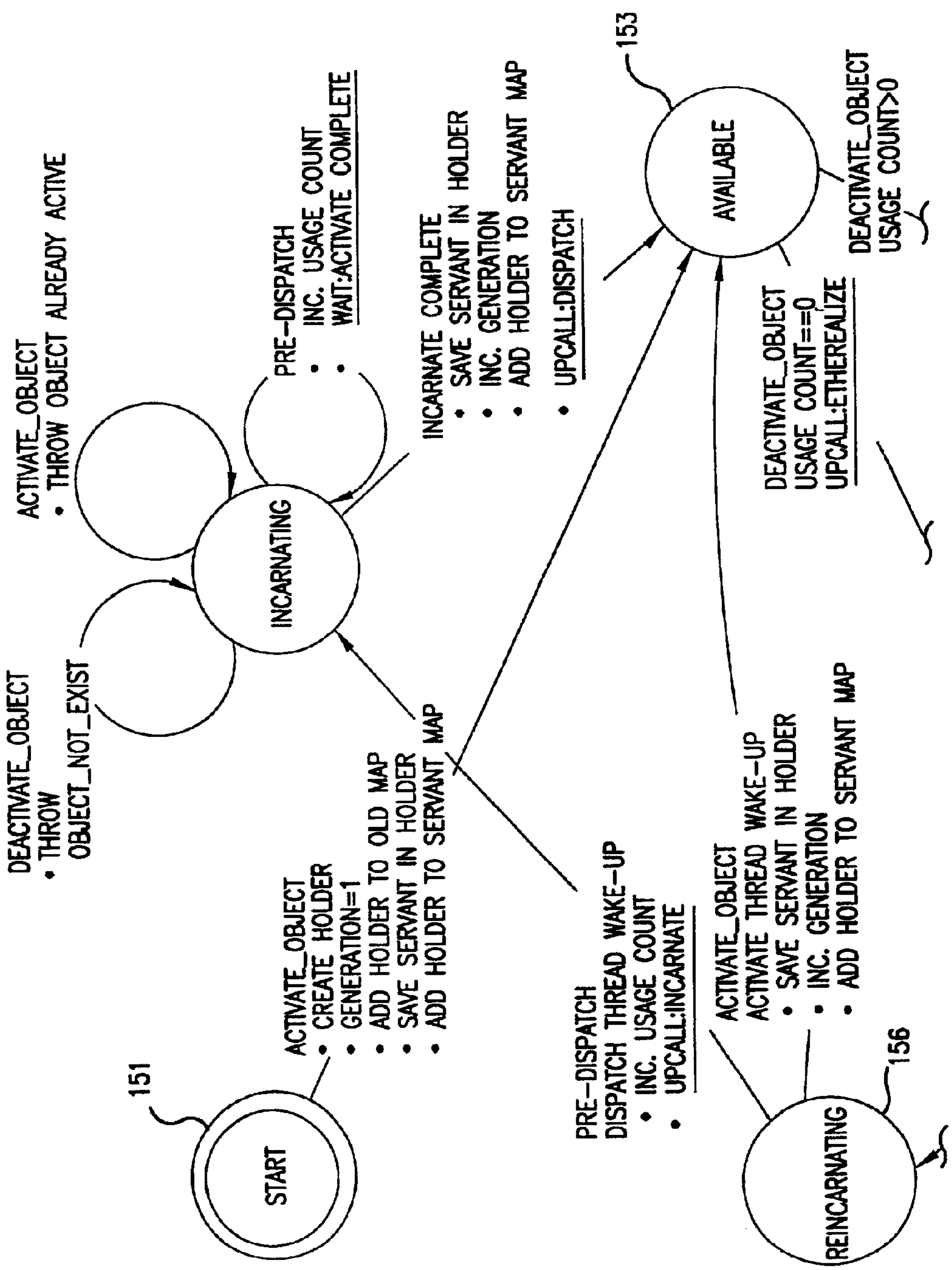
FIG. 5 is a state machine diagram illustrating an object in the present invention.
Figure 5A:
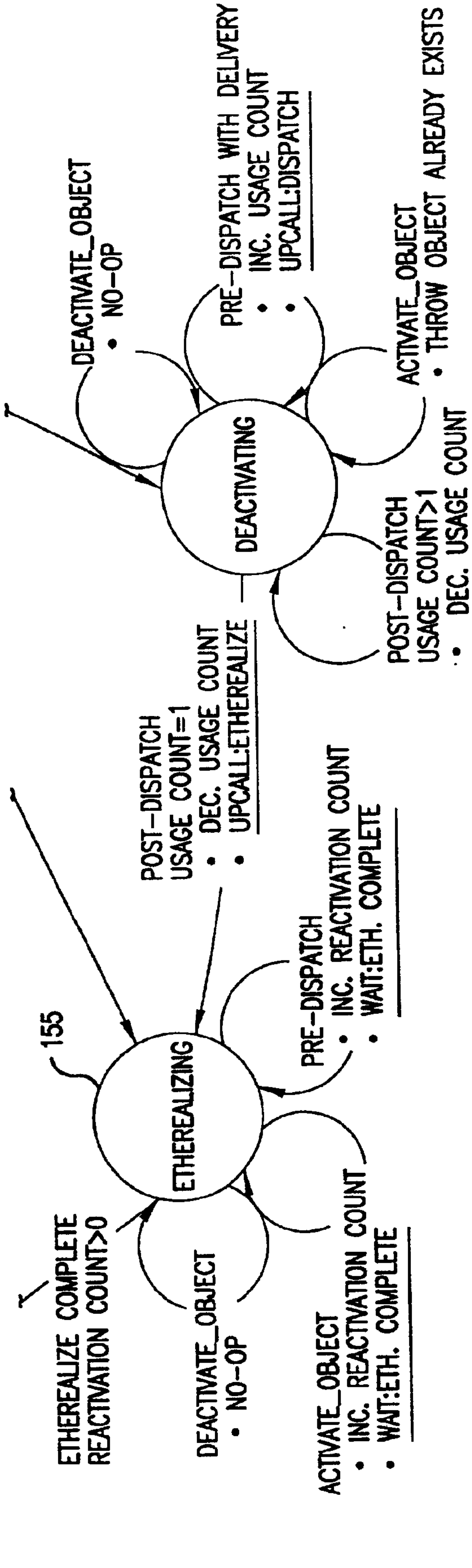

FIGS. 3 and 5 illustrate state machine diagrams. The state machine diagrams are simple and natural mechanism for modeling the lifecycle of objects within a multithreaded environment of the present invention. More specifically, a state machine includes three elements—an enumerated state variable, a reference counted condition variable, and a reference to an application-specific mutex. The mutex is controlled directly by the application; this allows the application to access the state and other resources within the same critical section.

Three operations are available on a state machine: querying the current state, changing the state, and waiting to enter a state. In order to query the state, the thread locks the application mutex and checks the enumerated state variable. In oder to modify the state, the thread locks the application mutex, updates the enumerated state variable, and issues a broadcast on the condition variable (if it exists). Finally, in order to wait for a state, the thread waits on the condition variable (simultaneously releasing the application mutex) and is woken when the state changes. When woken, the thread rechecks the state—if the state is still not desirable, the thread waits on the condition variable again.

Condition variables are potentially costly resources; therefore, they are preferably maintained only when necessary. The POA of the present invention uses a reference counting approach to ensure that condition variables are created and destroyed on demand. The first thread to wait for a state allocates the condition variable and its reference count, and sets the count to 1; subsequent threads simply increment the reference count. When a thread returns from waiting, it decrements the count, deleting the condition variable when the reference count drops to zero. This ensures that the condition variable only exists while threads are waiting on it.

I. POA Life Cycle

FIG. 3 illustrates the POA life cycle of the present invention in a state machine diagram. First, the POA states include:

1. Start, 101: The POA does not yet exist, and is not registered in the child POA map.
2. Created, 102: The POA has been created, but has not yet registered its interceptors with a binding manager. Consequently, the POA acts as if its POA Manager were holding. A POA can only exist in this state if it has been created as part of an AdapterActivator call.
3. Stillborn, 103: The POA has been created and destroyed before registering its interceptors with the binding manager. A POA can only exist in this state if it has been created as part of an AdapterActivator call, and was destroyed before the AdapterActivator returns.
4. Running, 104: The POA is accepting and dispatching requests.
5. Destroying, 105: POA::destroy has been called, but there are either outstanding requests or existent child POAs.
6. Etherealizing, 106: All outstanding requests have finished, all child POA have been destroyed, and the POA has begun etherealizing its servants.
7. Destroyed, 107: All activity in the POA has ceased, and all servants have been etherealized.

Second, the POA events include:

1. Explicit Creation: create_POA is called directly by the application.

The explicit POA creation occurs when an application directly calls create_POA. This form of creation is an atomic operation; the parent creates a new child POA instance, registers its interceptors with the binding manager, and places it in the Running state 104. By the time create_POA returns, the POA will exist and accepting requests. Explicit POA creation is only allowed when the POA with the given name does not exist, or when the POA with the given name is Etherealizing (i.e., unloading an object). In the latter case, create_POA must wait until the previous POA is completely destroyed before attempting to create a new POA instance.

2. Implicit Creation: create_POA is called by an AdapterActivator.

Implicit POA creation occurs when an application calls find_POA with the activate_it flag set for a POA that does not exist or a POA that is Etherealizing. To create the POAs, find_POA invokes unknown_adapter on the AdapterActivator associated with the parent. The AdapterActivator will eventually result in a create_POA call, creating the POA instance. However, the behavior of a POA is slightly different when created by an AdapterActivator. In such a condition, the POA acts as if its POAManager were in the holding state in the time between creation and the return from unknown_adapter. To properly achieve this, find_POA pushes a flag onto the thread specific stack prior to calling the AdapterActivator, and create_POA checks for this flag to determine if the invocation was made as part of an AdapterActivator call or as of a direct application call. If the flag exists, create_POA creates a new POA instance but places it in the Created state 102, and defers registering its interceptors. This allows find to return the newly created POA and prevents create from creating a POA with the same name, but causes requests intended for objects in the newly created POA (or any of its children) to arrive at the parent's child activation interceptor. As described above, this interceptor will see the POA has been Created and will queue the requests for later delivery. When unknown_adapter returns, the parent activates the new POA, changing its state to Running 104, registering its interceptors with the binding manager, and redispatching any queued requests through the binding manager before returning the POA instance.

Because unknown_adapter is called outside of a mutex, it is not an atomic process. This makes it possible for an application to call POA::destroy after the POA has been created but before the AdapterActivator has returned. This is handled by placing the POA in an intermediary Stillborn state 103, then blocking on the condition variable. When AdapterActivator::unknown_adapter returns, the creating thread will see the state as Sillborn 103 and transition it to Destroying 105, unblocking the destroying thread.

3. Implicit Create Complete: The AdapterActivator call which created the POA has returned.

A POA can be located using the find call only if it exists in its parent's child POA list, and its state is not Etherealizing.

4. Destroy: POA::destroy is called.

POA destruction has three application visible states: Destroying, Etherealizing, and Destroyed. A POA enters the Destroying state 105 when POA::destroy is first called and the POA either has children or is processing requests. The POA can only exit this state when all outstanding requests have completed, and all children have been completely destroyed. This is complicated by the possibility that in-progress requests will re-create some of the POA's children. To properly handle this, the destroying thread creates a gateway on the stack and spins in a loop. On each pass through the loop the thread checks the child POA list; if it is not empty, the thread walks the child list and destroys each child, waiting for completion.

When the POA's list of children is empty, the destroying thread checks if there are methods in progress. There are two parts to this condition. First, the thread checks a request in progress count maintained by the POA. This count is incremented when a request arrives at the POA's request interceptor and decremented after the POA performs cleanup from a request. If this value is zero, the destroying thread knows that there are no requests executing within the POA. However, this is insufficient—there may be requests that are in the POA's interceptor chain, but have not yet reached the POA itself. To handle this, the binding manager allows the POA to remove an interceptor only if it is inactive. If the interceptor cannot be removed, then there are still requests outstanding and the POA cannot be destroyed. In this case, the destroying thread releases the POA mutex and waits for the request in progress count to reach zero. When this occurs, the destroying thread wakes and loops, destroying any recreated children, rechecking the request in progress count, and removing the server binding. When the request progress count has reached zero and the server binding can be removed, the POA begins servant etherealization. This may cause strange results for method implementations that create child POAs. The method would be able to create the child, but might see an OBJECT_NOT_EXIST exception when attempting to use that child.

5. POA Quiescence: All outstanding requests have completed, and all POA children have been completely destroyed.

The POA enters the Etherealizing state 106 after quiescence if the application request servant etherealization. In this state, POA operations throw OBJECT_NOT_EXIST, find calls throw AdapterNonExistent, and incoming requests for the POA are discarded, but create calls wait until the POA has been completely destroyed. The POA will transition from Etherealizing 106 to Destroyed 107 when all servants have been etherealize.

6. Etherealize complete: All servants in the POA have been etherealized.

The POA becomes Destroyed when all activity has stopped—all requests are finished, all children are completely destroyed, and all servants are etherealized if necessary. The POA is removed from its parent's list of children, and becomes inaccessible to applications which do not already hold a reference; find calls will throw OBJECT_NOT_EXIST and create calls will proceed as normal. The actual POA instance will continue to exist until its reference count reaches 0, but operations called on that instance will throw OBJECT_NOT_EXIST.

In another aspect of the present invention, applications can choose between waiting for POA destruction to complete, or returning before the POA is actually destroyed. In the first case, the thread calling POA::destroy walks the POA through destruction directly, it waits for quiescence and etherealizes the POA's servants before returning. In the second case, POA::destroy simply changes the POA's state to marks it as requiring destruction, then posts an item to the ORB work queue. The thread handling this work item will actually walk the POA through destruction.

Note that it is possible for destroy to be called multiple times on a particular POA. Only the first call actually destroys the POA. Subsequent calls with the wait for completion flag cleared return immediately, and calls with the wait flag set simply wait for the POA state to change to Destroyed.

II. Request Processing

In the present invention, processing is performed by the Servant Request Interceptor, a per-POA interceptor registered with a binding name of [endpoint_format_id:endpoint_id]. Objects created by the POA use an object-key of [endpoint_format_id:endpoint_id:oid]. When a request arrives, the binding manager performs a best-match lookup on the object key, finding and dispatching the request to the interceptor associated with the POA.

The Servant Request Interceptor performs the following basic functionality:

1. Establish a POACurrent context by pushing the adapter and object id onto the thread specific stack, using a ThreadContext interfaces described in a Binding interface of the current invention. The Binding interface establishes a chain of request and message-level interceptors to represent a binding, or channel of communication between client and server. The Binding::ThreadContext instance carries local ORB-service-specific information associated with the request. Its accessor can be called at any time and the result must not be released. Typical ORB service implementations will use information from the in_service_contexts attribute to initialize their local state in the thread_context before calling invoke ( ) on the next ServerRequestInterceptor, and then make this state available to applications via an object with an interface derived from CORBA:: Current.
2. Call the POA to prepare the servant used to handle the request. The POA may create the servant using its associated ServantManager, if necessary. For example, a POA using a ServantActivator might incarnate the servant at this time. The POA also increments its "requests in progress" count to prevent itself from being destroyed while this request is executing. Exceptions thrown at this point are reported to the client and abort the request processing.
3. Dispatch the CORBA::ServerRequest to the servant returned by the POA
4. Remove the POACurrent context by popping it off the thread-specific stack.
5. Call the POA to perform any necessary cleanup necessary. For example, POAs with a ServantActivator may need to etherealize servants that are no longer in use at this point. The POA also decrements its "requests in progress" count, potentially causing self-destruction. Note that this cleanup occurs after the response has been sent to the client; this avoids expensive cleanup operations from affecting client response times, and ensures that exceptions generated during cleanup are not returned to the client.

The actual request processing strategy (USE_DEFAULT_SERVANT vs. USE_SERVANT_MANAGER vs. USE_AOM_ONLY) is preferably performed by the POA itself, rather than by the interceptor. This eliminates the need for accessing internal POA data in the interceptor, allows a single interceptor implementation to support multiple strategies, and simplifies the development of colocation by encapsulating the request processing mechanism within the POA.

Most forms of request processing can perform request cleanup after the response has been sent—since exceptions generated at this point should not be reported to the client, there is no need to add the overhead of cleanup to method execution times. Unfortunately, the CORBA 2.3 specification places additional restrictions on the use of servant location—in servant location, cleanup is performed as part of the request, and any exceptions thrown from ServantLocator::postinvoke is be reported to the client.

To accommodate this, POAs using servant location of the present invention use a different class of servant Request Interceptor. This interceptor creates a stack-based implementation of Binding::ServerRequestCallback that calls ServantLocator::post invoke during write__outputs. Because ServerRequestCallback:: write__outputs is called after the request is processed but before the response is sent, this allows cleanup as part of the request and properly return exceptions to the client.

III. Server Retention

The step of servant retention, preferably uses an Active Object Map (AOM). The Active Object Map acts as a two dictionary: relating object ids to servants and servants to object ids. For POAs with the USE__ACTIVE OBJECT__MAP ONLY or USE__DEFAULT__SERVANT policy, an entry is placed in the Active Object Map on activate object [with__id], and removed on deactivate object. POAs with the USE__SERVANT__MANAGER policy have more complicated logic for adding and removing entries in the AOM, as described below.

The primary requirement for the Active Object Map is scalability to large numbers of registered objects. Enabling this requires minimizing the amount of data stored per object. Tables 1–3 demonstrate the amount of data required per object. They do not include the overhead required by internal dictionary structures; this is expected to add between 8 and 12 bytes per object.

Figure 4:
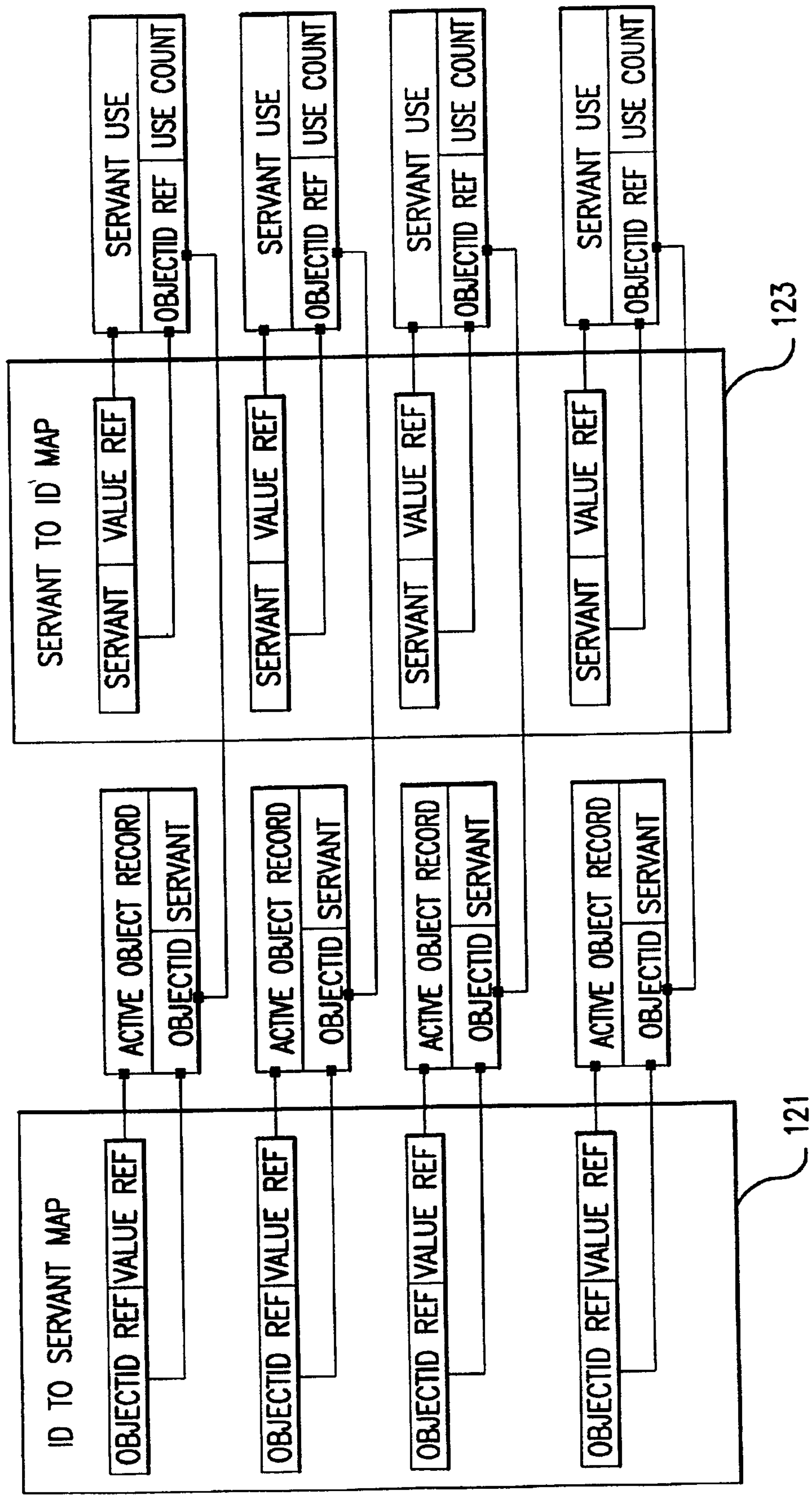
FIG. 4 a structural diagram illustrating an Active Object Map of the present invention.

A secondary requirement for the Active Object Map is the ability to scale to large numbers of POA. This could be accomplished by making the Active Object Map hashtables (a relatively costly resource) ORB-global rather than per-POA. However, this approach may require increasing the amount of data stored per-object, as the POA reference is stored as part of the key for each hash table to enable each POA to locate only its own registered objects. Further, the Active Object Maps can be kept per-POA, rather than per-ORB. In addition, child POA lists (another Rash-table) is preferably made ORB-global as well, again adding the parent POA as part of the key field. FIG. 4 illustrates an exemplary Active Object Map.

An ID to Servant Map 121 is used to match the Object Id contained within a request to a servant, as well as to implement the id__to__servant and id__to__reference methods. Each entry in the map is an ActiveObject record, containing an ObjectId and a servant. To reduce memory usage, the map key is a pointer to the ObjectId in the ActiveObject record.

Table 1 shows the memory usage required per-object in the ID to Servant Map 121:

TABLE 1

| Field | Representation | Size |
|---|---|---|
| Object Id reference (key) | Reference (pointer) | 4 bytes |
| Active Object Record (value) | Reference (pointer) | 4 bytes |
| Object Id | COBRA::OctetSeq | arbitrary |
| Servant | Reference (pointer) | 4 bytes |
| Total Size | | 12 bytes + sizeof(ObjectId) |

A Servant ID Map 123 is used to implement the servant__to__id and servant__to__reference methods. It is also used to determine if there are outstanding activations on a servant during etherealization. The map relates servant references to a ServantUsage record. The ServantUsage record consists of two elements: a usage count for that servant, and an ObjectId reference. The usage count can be queried to determine if there are other, outstanding activations for the servant—for example, this provides the proper value for the remaining activations parameter in ServantActivator::etherealize. The ObjectId is a reference to the id with which the servant is associated. If the POA uses the SINGLE__ID policy, the id is reference to the ObjectId stored within the ActiveObject associated with the servant. If the POA uses the MULTIPLE__ID policy, the id is always null.

Table 2 shows the memory usage required per-object in the Servant to ID map 123:

TABLE 2

| Field | Representation | Size |
|---|---|---|
| Servant (key) | Reference (pointer) | 4 bytes |
| Servant Usage Record (value) | Reference (pointer) | 4 bytes |
| Usage count | COBRA::ULong | arbitrary |
| Object Id Reference | Reference (pointer) | 4 bytes |
| Total Size | | 16 bytes |

IV. Servant Activation

Servant retention with servant activation is complicated by possible interactions between servant incarnation and activation, and the need to serialize calls to incarnate and etherealize on a particular object. To handle these complications, the process for incarnating and etherealizing servants using a ServantActivator is modeled as a state machine. Each servant is associated with a state variable and an on-demand condition variable. The state variable is protected by the per-ORB mutex. Servants are incarnated and etherealized, and Active Object Map entries are added and removed in response to state transitions.

Properly tracking an object's state requires additional information stored on a per-object basis. This information is kept as part of the Active Object record within the Active Object Map, and consists of four elements: an explicit state variable, an on-demand condition variable, an outstanding reference count, and a reactivation count. Again, the amount of state information is designed to be as minimal as possible. Table 3 shows the storage types and total memory usage required per-object, beyond that already required for servant retention:

TABLE 3

| Field | Representation | Size |
|---|---|---|
| On-Demand Condition | pointer | 4 bytes |
| Explicit State | enum | 1–2 bytes |
| Reference Count | COBRA::UShort | 2 bytes |

TABLE 3-continued

| Field | Representation | Size |
|---|---|---|
| Reactivation Count | COBRA::UShort | 2 bytes |
| Total | 20 bytes (18 bytes + 2 for padding) | |

The reference count prevents premature etherealization of an object; an object is etherealized only when the reference count is zero. This has the effect of serializing the state machine in the Terminating state; a thread can prevent the object from passing the Terminating state by incrementing the reference count. The reference is incremented during method dispatching to prevent etherealization while a method is in-progress. It is also used during servant reactivation; when a servant is reactivated, the reference count is set to the previous reactivation count. This prevents the new servant from being etherealized until all threads waiting for the new servant incarnation have completed processing.

Because object etherealization is not an atomic process, requests may arrive or activate attempts may be made on an object while it is being etherealized. The reactivation count is checked after a servant has been etherealized; if the count is non-zero, there is at least one thread waiting to incarnate or activate a new servant generation. In this case, the reactivation count will be transformed into a reference count, indicating that requests are in-progress on the object, and the waiting threads will be woken. The first woken thread is responsible for activating a new servant generation—if the woken thread was previously waiting for to deliver a method request, the activation is performed by calling ServantActivator::incarnate; if the woken thread was previously waiting to explicitely activate the object, it does so immediately and returns.

FIG. 5 illustrates the complete lifetime for an object in a retaining POA with automatic activation. Note that the diagram describes object lifetime, not necessarily the lifetime of a particular servant. Specifically, throughout the lifetime of the object, several servants may be incarnated or etherealized.

In the present invention, the object states preferably include:

1. Start, 151: No entry exists for the OID in the AOM.
2. Activating: An ServantActivator::incarnate call is in progress for this OID.
3. Available, 153: An entry exists for the OID in the AOM, and the servant is existent and running. Newly arriving requests operate on the current servant.
4. Terminating: The object has been deactivated, but there are still requests outstanding on the current servant. The object is considered active until all requests (both in-progress and newly arriving) have completed, at which point the object will be deactivated and the servant etherealized.
5. Etherealizing, 155: The object has been deactivated, and a ServantActivator::etherealize call is in progress. Newly arriving requests cause servant re-incarnation, and operate on the next servant.
6. Reincarnating, 156: The current servant has been etherealized, but one or more method requests are outstanding on the object. A new servant will be incarnated during the pre dispatch phase of the first request.

Moreover, the present invention includes the following object events:

1. Pre-dispatch: A method invocation has been delivered to the POA. All pre-dispatch actions will eventually result in an post-dispatch action.
2. Post-dispatch: A method invocation has ended.
3. Servant Activation activate_object has been called for the OID.
4. Servant Deactivation deactivate_object has been called for the OID. Potentially also includes POAManager::deactivate and POA::destroy.
5. Incarnate Complete The servant has been fully incarnated.
6. Etherealize Complete The servant has been fully deactivated and etherealized.

Object activation refers to the process of explicitly activating the an object using POA::activate_object. Activation is allowed only if the object holder does not exist, or if the object is in the process of deactivating. In the first case, activate object creates the object holder and immediately makes the object Available. In the second case, activate object blocks until the object is fully deactivated, then attempts to reactivate it. This case is discussed in more detail below in connection with Object Reactivation discussion.

Activate object throws ObjectAlreadyExists if the servant is Available or Incarnating. The decision to prevent object activation while the servant is incarnating simplifies the case where an explicit activation was performed at the same time as an incarnation; accepting the explicit activation over the incarnation greatly increases the complexity of serializing the etherealize/incarnate calls, without providing significant benefits. It should be that the present invention conforms to the POA specification and all proposed revisions, and has no visible impact on the application developer.

In the present invention, request processing consists of a pre-dispatch phase, a dispatch phase, and post-dispatch phase.

The pre-dispatch phase is responsible for ensuring that the Servant is Available and properly updating the reference count to reflect the method in progress. If the object doesn't exist, the thread first creates a holder in the Activating state, then incarnates the servant using the ServantActivator. Once the servant has been incarnated, the thread makes the object Available, increments the reference count, and dispatches the request.

If the object exists but the servant is activating in another thread, the thread increments the reference count to prevent the servant from being prematurely etherealized, then waits for the activation to complete. When the activation completes, the thread dispatches its request.

If the object exists but is in the process of etherealizing, the thread must reactivate the object. The steps required to do this are described below in connection with Object Reactivation.

Once pre-dispatch returns, the servant is guaranteed to be Available and protected by the AOM mutex. At this point, the thread can release the mutex and call ServantBase::_dispatch to up-call into the method code.

The post-dispatch phase is responsible for cleaning up after a method invocation. Normally, this cleanup just consists of dropping the reference count. However, additional work may be required if the servant has been deactivated. In this case, post-dispatch checks the reference count after decrementing. If the reference count has dropped to zero, we know this is the last request outstanding on the given servant. The object's state is changed to Etherealizing, and the thread up-calls ServantActivator:: etherealize. Because etherealize occurs outside of mutex control, it is possible for requests to be delivered or for a thread to call activate_object while an etherealize call is in progress. Either of these conditions will cause the object's reactivation count to be incremented, as described below in connection with Servant Reactivation. Assuming reactivation does not occur, the thread will remove the object holder from the AOM and delete it when etherealize returns.

Request processing is the normal case; it is the most common scenario, and must be made highly efficient. Although the efficiency of this scenario can be determined from the above descriptions and state diagram, the following pseudo-code further illustrates the point:

```
ServantActivatorInterceptor::dispatch
{
    lock mutex
    find entry for oid in object map
    if (entry exists)
    {
        if (entry state is AVAILABLE)
        {
            increment entry reference count
            unlock mutex
            dispatch request using servant
            lock mutex
            decrement entry reference count
            if((entry state is TERMINATING or
            entry state is TERMINATING_WITH_ACTIVATION) and
            entry reference count is 0)
        {
            // . . . some code for cleanup of servant
        }
        else
        {
            // . . . some code for handling non-normal states
        }
        }
        else
        {
            // . . . some code for creating the initial entry
        unlock mutex
}
```

Object deactivation occurs when an application calls POA::deactivate . . . object. Deactivation only occur if the object is in the Available state. Attempts to deactivate an object in the Start, Incarnating, Etherealizing or Reincarnating state result in OBJECT_NOT_EXIST, and attempts to deactivate an object in the Deactivating state are ignored (i.e. the deactivation has already started, but has not yet completed). If the object is Available state, deactivation may not be able to proceed immediately if there are method requests in progress on the servant (i.e. the reference count is non-zero). In this case, we transition to the Terminating intermediate state; when the last in-progress request completes, the current servant generation will be etherealized. Refer to Post Dispatch Processing, discussed below, for more detail.

Even if the object is Available and there are no outstanding requests, the POA specification prohibits the deactivating thread from blocking until the servant is etherealized. To prevent this blocking, the deactivating thread simply marks the object as Etherealizing to prevent new requests from dispatching, then posts an item to the ORB's work queue. The work item will etherealize the servant during the ORB's event processing loop.

The POA of the present invention preferably supports three options for request processing during deactivate: delivery, holding, and discarding. The mechanism used to choose between these options is described in [POAREQ]; this section simply describes the behavior of the POA during 1. DELIVER—The POA will continue to deliver request as long as the object is deactivating. When no more requests are executing, the object will transition from Deactivating to Etherealizing. Refer to Post-Dispatch Processing discussed below for more information.
2. HOLD—Request currently executing in user code will complete, but new requests will block until the current servant is etherealized, then causing reincarnation. Refer to Object Reactivation discussed below for more information.
3. DISCARD—The POA will allow requests currently in user code to complete, but will throw the TRANSIENT exception if new requests arrive for the object while it is Deactivating. Requests will continue to hold if they arrive while the object is Etherealizing.

Object reactivation occurs when a method or activation request arrives while an object is being etherealized, or if the object is deactivating with the HOLD request processing option. Effectively, object reactivation waits for the current servant to be fully etherealized, then activates a new servant for the object. To perform object reactivation, the thread making the request increments the reactivation count—indicating that it is waiting for a new servant generation. It then waits until the current servant generation is Reincarnating.

When a servant eterealization is complete, the thread performing the etherealization checks the reactivation count. If this count is non-zero, there are other threads waiting for the etherealization to complete. The etherealizing thread changes the state to Reincarnating, then broadcasts the condition variable to wake the blocking threads. The first thread woken will see that the object's state is Reincarnating, and will perform the steps needed to reactivate the servant, for example, if the thread was in the process of method dispatching, it will call ServantActivator:: incarnate to create a new incarnation. The thread also sets the reference count to the reactivation count, and clears the reactivation count; this ensures that all waiting threads waiting have a chance to use the new generation.

Note that it is possible for a method or activate request to arrive after the servant has been etherealized, but before any reactivating threads have woken. In this case, the thread making the request performs the object reactivation.

Most operations are defined in the POA specification against a POA-defined Active Object Map. Since this Active Object Map does not directly correspond to the AOM used in this design, some care needs to be taken to ensure that operations defined using the POA AOM function correctly. The view taken here is that an object is considered to exist in the POA AOM when it is Available or Terminating. The one exception to this rule is the activate object call; this call considers an object to exist when it is Available, Terminating, or Incarnating.

V. Persistent POA Design

Support for persistent servers relies on three auxiliary objects: a daemon proxy, a persistent POA registry, and a activator registry. The daemon proxy represents the server's connection to the location daemon—it is created on demand the first time a persistent POA is created or an AdapterActivator is registered.

The endpoint state objects are maintained in a special transient POA.

When a transport delivers a request, the binding manager looks for a binding using the object key in the request. The key for objects implemented in the POA is endpoint-id:FQPN:oid and the key used by POAs to register with the binding manager is endpoint-id:FQPN. This makes the FQPN the distinguishing segment of the object key—if an entry does not exist for a particular FQPN, the request cannot be dispatched.

TRANSIENT POAs can exist in only one process, and at only one time. Failure to find the binding for a TRANSIENT POA indicates that the POA no longer exists, and consequently the object no longer exists. To handle this, we rely on the default behavior of the binding manager, which returns OBJECT_NOT_EXIST to the client.

PERSISTENT POAs, however, are very different—a PERSISTENT POA can live across processes. Consequently, failure to find the binding for a PERSISTENT POA may simply indicate that the POA resides within another process, and that the client should contact the daemon in order to locate the POA.

Although the preferred embodiments of the invention have been described in the foregoing description, it will be understood that the present invention is not limited to the specific embodiments described above.

What is claimed is:

1. A method of controlling a life cycle of an object in a multi-thread computing environment, comprising:

creating a table containing a list of active objects;

determining whether or not an object is listed in the table; and if the object is not listed in the table, then:

mutex locking the table;

entering an object id of the object into the table;

setting a first count associated with the object id in the table to value of one; and unlocking the mutex lock without waiting until the object is completely loaded.

2. The method of claim 1 if the object is listed in the table, then:

incrementing the first count; and determining whether or not the object is etherealizing.

3. The method of claim 2 if the object is etherealizing, then:

waiting the object to be completely etherealized; and reactivating the object.

4. The method of claim 1 further comprising:

incrementing the first count when an additional request is made to the object; and decrementing the first count when the request is dispatched on the object.

5. The method of claim 4 further comprising:

deactivating the object only when the first count is equal to zero.

6. A method for controlling a table containing a list of active objects, wherein the table is accessed by one or more threads in a multi-threaded computing environment, comprising:

mutex locking the table with a first thread when activating an object provided that the table is not locked by a second thread;

creating an entry for the object in the table when the entry does not exist in the table, wherein the entry includes a reference count;

incrementing the reference count of the object if the table is locked by the second thread; and unlocking the table from the mutex lock after incrementing the reference count whether or not the object is completely activated.

7. The method of claim 6 further comprising:

etherealizing the object only when the reference count of the object is zero.

8. The method of claim 6 further comprising:

incrementing a reactivation count if the object is etherealizing when the first thread attempts to activate the object, wherein the entry of the table further includes the reactivation count.

9. The method of claim 8 further comprising:

broadcasting the reactivation count to wake any waiting object to reactivate the etherealized object.

10. The method of claim 8 further comprising:

decrementing the reference count after dispatching a request on the object.

11. The method of claim 10 further comprising:

deactivating the object only when the reference count is equal to zero.

12. A server computer in a client-server computing environment, comprising:

a memory configured to store a table containing a list of active objects; and a processor configured to determine whether or not the object is listed in the table;

wherein the processor, if the object is not listed in the table, is further configured to mutex lock the table, to enter an object id of the object to be activated into the table, to set a first count to one, and to unlock the mutex lock without waiting until the object is completely loaded; and wherein the first count is associated with the object id in the table.

13. The server of claim 12 wherein the processor is further configured to increment the first count and to determine whether or not the object is etherealizing if the object is listed in the table.

14. The server of claim 13 wherein the processor is further configured to wait the object to be completely etherealized, and to reactivate the object if the object is etherealizing.

15. The server of claim 11 wherein the processor is further configure to increment the first count when an additional request is made to the object and to decrement the first count when the request is dispatched on the object.

16. The server of claim 15 wherein the processor is further configured to deactivate the object only when the first count is equal to zero.

* * * * *